UNITED STATES PATENT OFFICE.

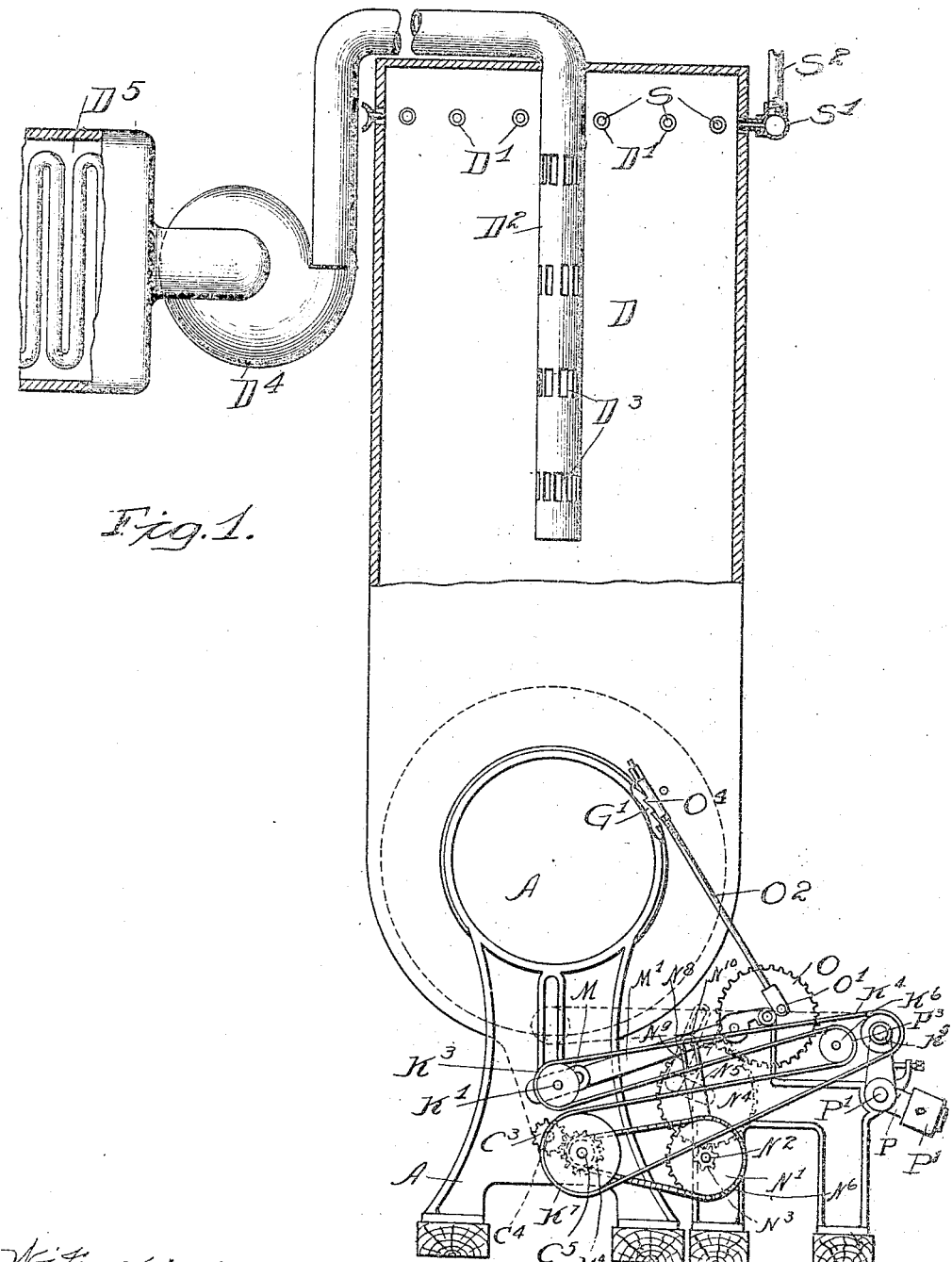

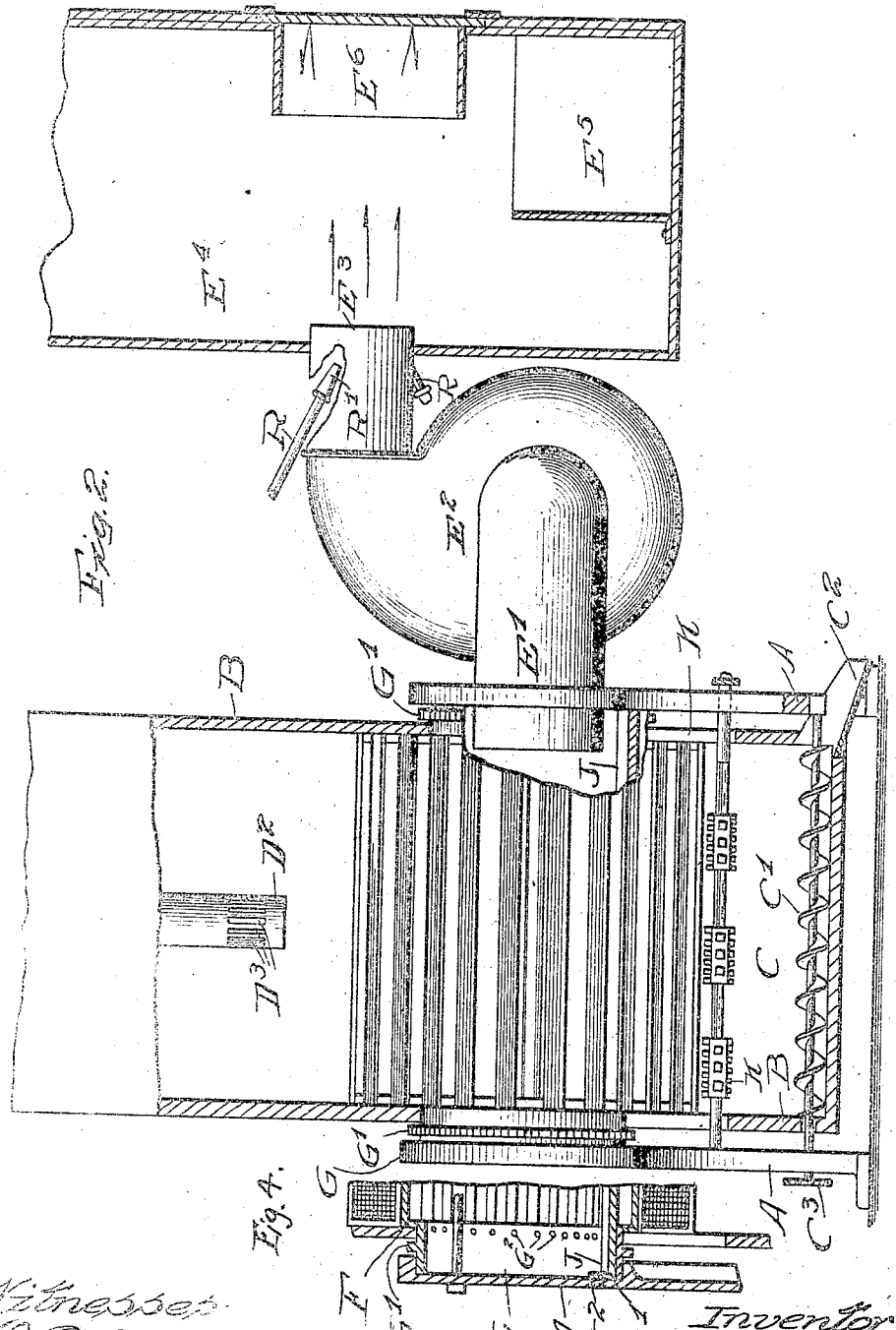

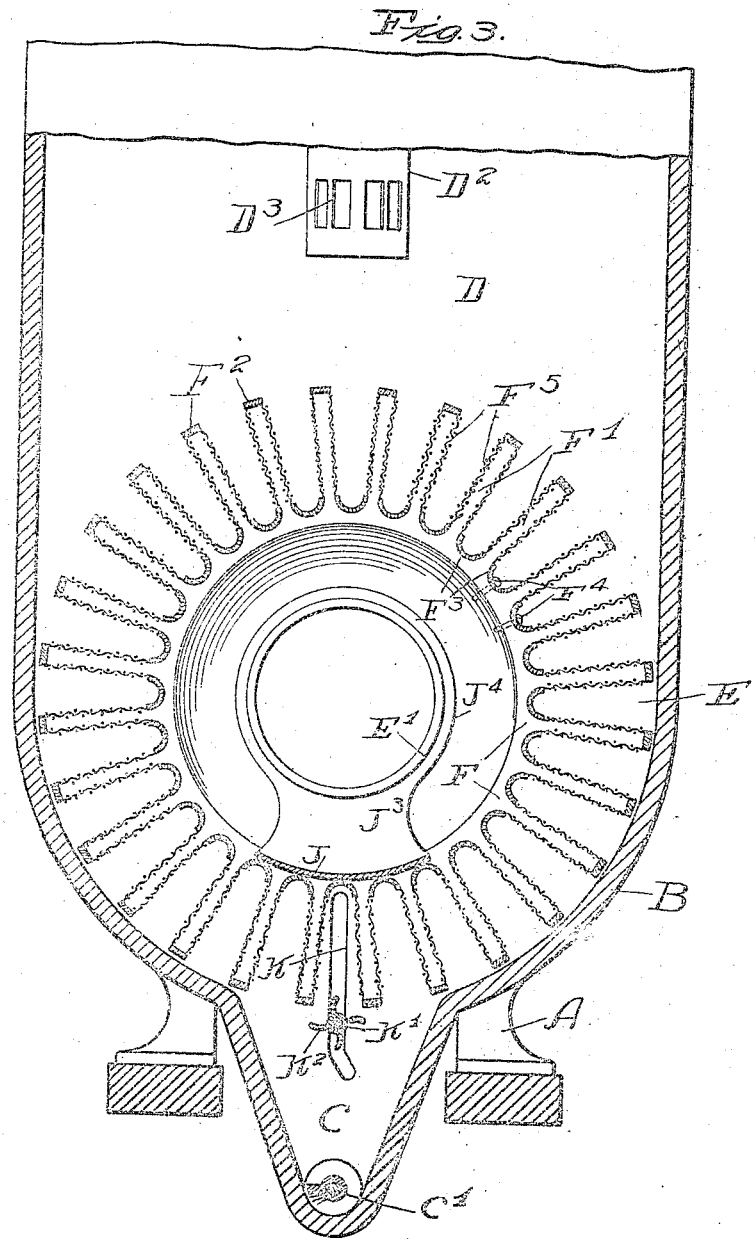

ALBERT P. HUNT, OF CHICAGO, ILLINOIS.

DESICCATING APPARATUS.

1,050,463.

Specification of Letters Patent. Patented Jan. 14, 1913.

Application filed April 26, 1912. Serial No. 693,332.

*To all whom it may concern:*

Be it known that I, ALBERT P. HUNT, a citizen of the United States, residing at Chicago, in the county of Cook and State of Illinois, have invented a certain new and useful Improvement in Desiccating Apparatus, of which the following is a specification.

My invention relates to apparatus for collecting dry powder from liquids and has for its object to provide means for desiccating any kind of material, but I have illustrated my invention in a form applicable for the desiccation of milk.

One form of my invention is illustrated in the accompanying drawings, wherein—

Figure 1 is a side elevation with parts broken away; Fig. 2 is a front elevation with parts broken away; Fig. 3 is a cross section with parts removed; Fig. 4 is a detail cross section.

Like parts are indicated by the same letter in all the figures.

A, A are the side frames on which is mounted the case B shaped as shown or in any desired manner and having the receiving chamber C below in which rotates the conveyer $C^1$ which discharges into the spout $C^2$ and is driven by the pinion $C^3$ on the shaft $C^4$, such pinion being driven from the shaft $C^5$. The case has an upper compartment D preferably perforated at the top at $D^1$ $D^1$ to permit of the introduction of the liquid to be desiccated. $D^2$ is a hot air pipe having the groups of laterally opening apertures $D^3$ $D^3$. It is supplied by the fan $D^4$ from the air heating chamber $D^5$. The case has an intermediate chamber E in which is mounted the separator. I have called these three chambers for convenience, the upper one the drying chamber, the intermediate one the separating chamber, and the lower one the collecting chamber. The intermediate or separator chamber E has at one end the air discharge pipe $E^1$ opening into the fan $E^2$ with the discharge end $E^3$ which opens into the box $E^4$, the upper portion of which has a collecting box $E^5$.

$E^6$ is a cup opposite the opening $E^3$ into which the air is received, as indicated by the arrows.

F is a ring shaped as shown and having a series of projecting fingers $F^1$. There are two of such rings and they are connected by outer slats $F^2$, some of which are indicated in Fig. 3. These slats are secured by nails or screws driven therethrough into the outer end of each finger. The rings are also connected by the transverse ribs $F^3$ secured each at each end by a screw $F^4$ to the ring. Intermediate the slats and ribs are sheets of wire gauze $F^5$. The rings, slats, ribs, and wire gauze make up a drum or cage which is mounted at each end in one of the frame pieces A by means of the short thimble G, which is provided with the exterior ratchet wheel $G^1$ and is inserted inside the ring F and secured thereto by a series of nails or screws $G^2$ $G^2$. The thimble passes through a suitable aperture in the wall of the case B as indicated in Fig. 4. The same arrangement can be employed at each end. The separating drum is thus mounted so as to be rotated step by step in a forward direction by means of the ratchet wheels at its ends. It is arranged so as to snugly fit the lower end of the case and substantially fill the separating chamber and so as to be interposed between the upper or drying chamber in the case and the lower or collecting chamber C.

J is a guard shaped as shown and turned up at one end at $J^1$ and secured by one or more screws $J^2$ to the upper enlarged portion of the standard A. At its other end it has an upwardly extended portion $J^3$ with a ring $J^4$ which hangs upon the inwardly projecting pipe $E^1$. In this manner the guard is held fixedly in position within the separating drum and so as to cover the lower sections thereof. The sides of the case are slotted at K K to permit the vertical movement of the rod $K^1$ which carries the brushes $K^2$. The rod and brushes together make a cleaning brush which is intended to pass upwardly between the sections of the drum and brush the dried or desiccated materials from the sides of the collecting screens.

The mechanism for operating the drum and the brush is shown in elevation at one end but it will be understood that the parts may be duplicated so far as that is necessary, at each end of the drum and brush.

At the end of the rod $K^1$ is a wheel $K^3$ over which travels the belt $K^4$ around the two small pulleys $K^5$, $K^6$, and the large pulley $K^7$. Thus whenever the latter is driven the brush is rotated, the parts being mounted as indicated so that this is true no matter what the position of the brush. Each end of the brush rod is mounted in the slot M in the outer end of the lever arm $M^1$ which is pivoted at M². Thus when this arm is raised or lowered the brush is made to travel inwardly and outwardly along the radius of the drum. The pulley or wheel K⁷, mounted on the shaft C² is carried thereby and this shaft is driven by any desired means.

M⁴ is a pulley on such shaft whereby it may be driven.

On the shaft C⁵ is a sprocket wheel which drives the chain N which in turn operates the wheel N¹ on the shaft N² which carries the small pinion N³ which drives the wheel N⁴ mounted on the shaft N⁵. The shafts N² and N⁵ are mounted on the support N⁶. Toward the outer part of the wheel N⁴ is attached a pin N⁷ shown in two different positions in Fig. 1 and from it projects a link N⁸ with a slot N⁹ at its upper end to receive a pin N¹⁰ on the lever M¹. By this means the lever M¹ is moved upwardly and downwardly. Mounted on the same supporting frame N⁶ is a wheel O provided with the eccentric pin O¹ which reciprocates the rod O² which carries the dog O³ which lies against the ratchet wheel G¹ so that by the rotation of the wheel O the rod is reciprocated and the ratchet wheel moved forward step by step to rotate the drum.

P is an elbow crank lever mounted at P¹ on the frame and carrying at one end the weight P² and at the other end the line P³ at whose two extremities are mounted the pulleys K⁵ and K⁶ which together with the belt operate to keep the belt tight.

R is a steam pipe and there may be several of these supplying steam from any desired source to one or more nozzles R¹ within the pipe E³.

S, S may be the ends of spray pipes opening into the holes D¹ D¹ and connected each with a header S¹ to which leads the supply pipe S² from any desired source. This is a diagrammatic showing of the means by which the material to be treated may be introduced in a spray.

I have not shown all the details of the driving mechanism because the structure will be evident to any mechanic. The important parts of my invention are the spraying, drying, separating and collecting means and their association with each other.

I do not wish to be limited to the precise arrangement, size, form and construction of the several parts, and this is particularly true as to the driving mechanism, because changes can be made without departing from the spirit of my invention.

The use and operation of my invention are as follows: The material to be desiccated, as for instance, eggs or milk, is discharged in any manner through the apertures D¹ which I denominated the spray apertures because their structure should be such that the material would be sprayed into the case. The drying or hot air is introduced through the air pipe in laterally disposed sheets which are spaced apart and through which the sprayed matter falls, being successively more and more dried until it reaches the bottom of the pipe where, if the arrangements are properly made, the solid matters will be substantially in a thoroughly dried condition and carried in the current of hot air. This current of hot air in its attempt to escape finds its only outlet through the collecting screens in the sections of the separating drum and through these it passes in the manner indicated by the arrow to the center of the drum and thence out through the pipe E¹. In so doing, however, the solid materials are collected on the screens. If any solid material remains it will be gathered in the supplementary collector which in this case consists of the cup E³ coöperating with the steam pipes which slightly moisten such material so that it sticks against the back wall or bottom of such cup. The air rebounds and passes out through the upper opening in the chamber E⁴. To collect the principal volume of the solid materials it is necessary to brush them from the outside of the screens and this is also necessary to enable the screen to be kept free enough to permit of the passage of the air. This is done by the brush which is reciprocated to and from the center of the drum so as to pass between its sections. At the same time it is rotated so as to cause it to perform the function of brushing. This is accomplished as indicated above, by means of the driving mechanism. There is first the brush rotating mechanism which keeps the brush steadily rotating in all its positions. There is next, the brush reciprocating mechanism which moves it to and fro along the surfaces to be brushed. This mechanism, of course, is as above described, intermittent in its action. It is a step by step motion. There is also a continuously acting collector driving mechanism. The collector driving mechanism is intended simply to keep the collecting screw continuously operating so that the desiccated materials in the collecting chamber will be constantly moving outwardly toward the discharge chute into the receptacle intended to contain them not here shown. The belt with its tightener keeps the brush rotating. The arms on which the brush is mounted are alternately moved upwardly or downwardly by the action of the wheels and the eccentrically mounted pin so that the brush moves inwardly between the two sections when the drum is at rest and moves outwardly remaining outside the circumference of the drum while the latter is moved forward by the drum moving mechanism which contains the reciprocating rod and dog associated with the ratchet wheel. By this means the process is continuous. The steam pipe, as above explained, serves to moisten the unseparated and uncollected solid matter in the current of hot air which escapes from the case or is thrown upwardly by the fan $E^2$.

I claim:

1. A desiccating apparatus comprising a closed case provided with gas and material inlet openings near one end, the gas inlets consisting of a series of openings laterally discharging into the case at different points along the length thereof, gas and material outlet openings near the other end, and intermediate the two sets of openings a separating device through which all the material and gas pass and whence all the cleaned gas is directed to the gas outlet opening and all the collected material to the material outlet opening, in combination with means for forcing hot gas through the case and liquid material into the case.

2. A desiccating apparatus comprising a closed case provided at one end with a pipe projecting thereinto, said pipe having a series of groups of gas inlet openings thereabout along its length and material inlet openings in the case near the same end of the case, gas and material outlet openings near the other end of the case, and intermediate the two sets of openings a separating device through which all the gas passes and whence all the cleaned gas is directed to the gas outlet opening and all the collected material to the material outlet opening, in combination with means for forcing hot gas through the case and liquid material into the case.

3. A desiccating apparatus comprising a closed case provided with gas and material inlet openings near one end, the gas openings consisting of a pipe and series of openings therein laterally discharging into the case at different points along the pipe, gas and material outlet openings near the other end and intermediate the two sets of openings, means for separating the material and gas and directing all the cleaned gas to the gas outlet opening and all the collected material to the material outlet opening, and a combination of means for forcing hot gas through the case and liquid material into the case.

Signed at Chicago, county of Cook and State of Illinois, this 17th day of April 1912.

ALBERT P. HUNT.

Witnesses:
 FRANCIS W. PARKER, Jr.,
 LULU JORDAN.